D. A. SCHUTT.
GRAIN DRILL.
APPLICATION FILED DEC. 6, 1906.
903,235.
Patented Nov. 10, 1908.
2 SHEETS—SHEET 1.
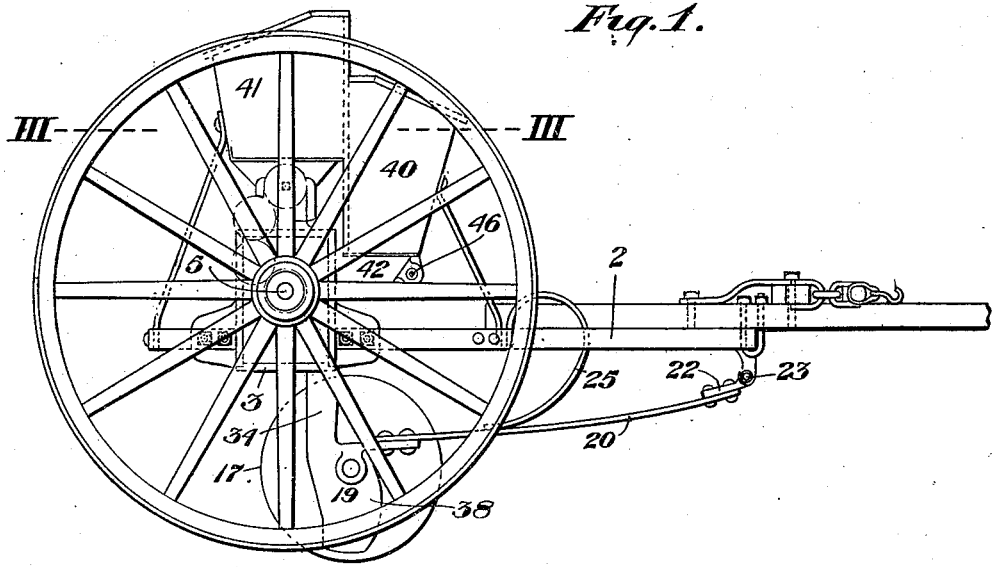
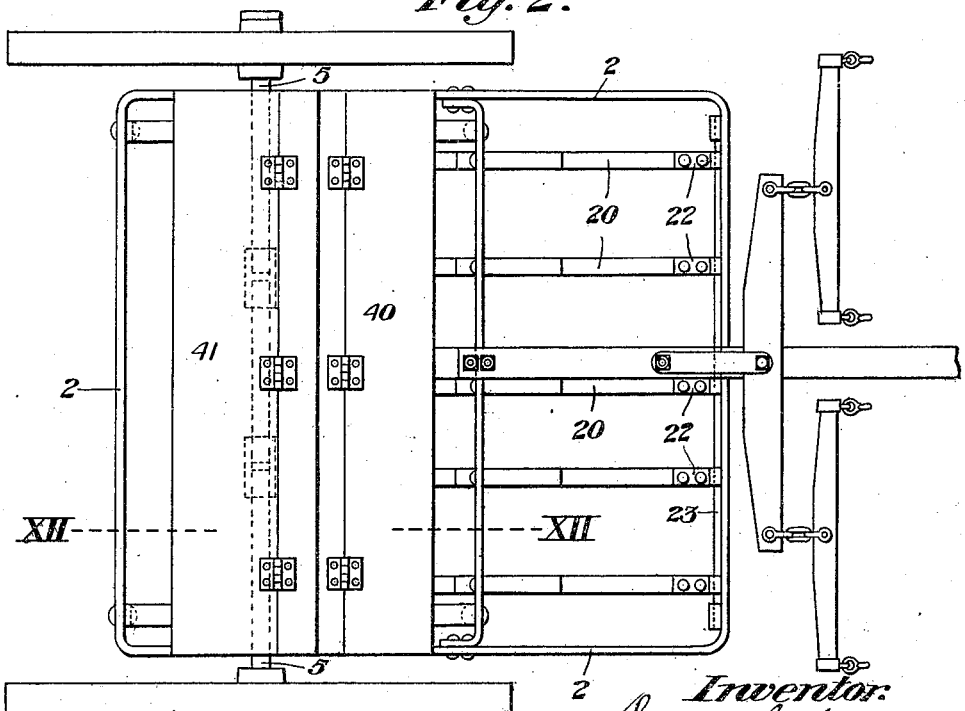

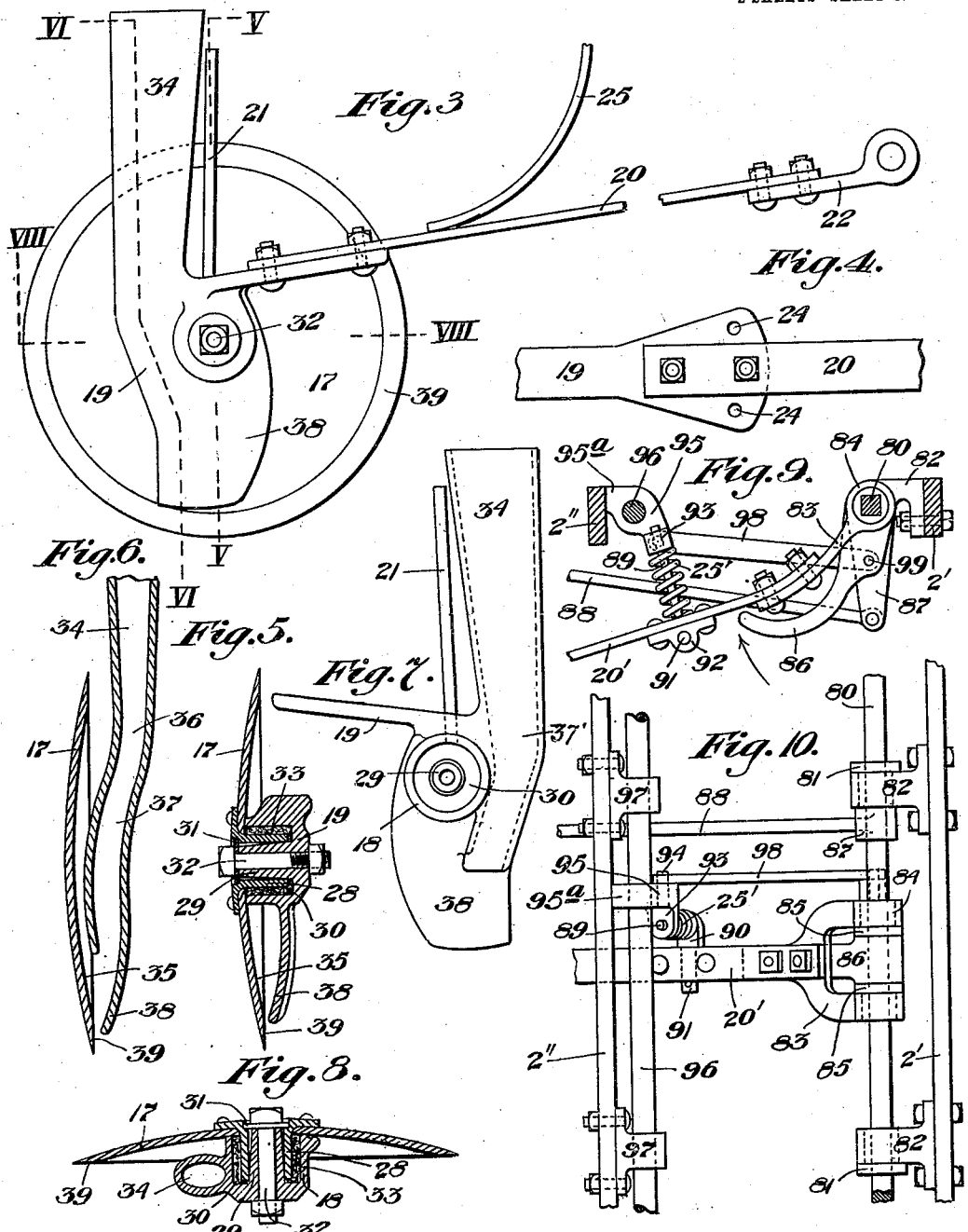

UNITED STATES PATENT OFFICE.

DUNY A. SCHUTT, OF PERU, INDIANA.

GRAIN-DRILL.

No. 903,235.  Specification of Letters Patent.  Patented Nov. 10, 1908.

Application filed December 6, 1906. Serial No. 346,663.

*To all whom it may concern:*

Be it known that I, DUNY A. SCHUTT, a citizen of the United States, residing at Peru, in the county of Miami and State of Indiana, have invented certain new and useful Improvements in Grain-Drills, of which the following is a specification, reference being had therein to the accompanying drawing.

My invention relates to improvements in grain drills for the purpose of planting grain or seed, and it has for its object to provide an apparatus which will properly distribute the fertilizer and the grain, an improved disk construction, means for adjusting the pressure of the disks, and various other features as shall be more fully hereinafter set forth.

Referring to the drawings, Figure 1 is a view in side elevation of the complete machine. Fig. 2 is a plan view of Fig. 1. Fig. 3 is a view of the disk in side elevation. Fig. 4 is a detail plan view of the connection with the disk hanger. Fig. 5 is a vertical sectional view on the line V. V. of Fig. 3. Fig. 6 is a similar sectional view on the line VI. VI. of Fig. 3. Fig. 7 is an inner face view of the disk hanger. Fig. 8 is a cross sectional view on the line VIII. VIII. of Fig. 3. Fig. 9 is a detail view showing a modified construction of spring pressure device for the disks. Fig. 10 is a plan view of Fig. 9.

2 represents the main frame of the machine, of bar iron or other suitable material, supporting the grain box and fertilizer box, and mounted upon or connected at each side with the housing boxes 3 carrying the axle bearing blocks. The axle of the machine is composed of two sections 5, 5, one for each side of the machine and capable of operating together in straight driving, or so that the inner axle and its wheel will remain stationary while the outer one and its wheel will travel, as in turning a corner, as indicated in dotted line in Fig. 2.

17 are the feeding disks journaled for rotation upon the hubs 18 of the disk-hangers 19 carried at the rear ends of drag bars 20 and preferably provided with vertical oil supply tubes 21 extending upwardly a suitable distance above the disks, as shown. The front ends of the drag bars are secured to gudgeons 22 pivotally mounted on cross shaft 23 and where it is desired to change the rake or angle of the disks, the connection between the drag bar and the hanger may be made adjustable in any suitable manner as by providing a plurality of laterally arranged bolt holes 24 in the front end of the disk hanger, as in Fig. 4.

Resilient pressure downwardly upon the disks is effected through pressure springs 25 of flat spring steel shape as shown in the principal figures of the drawings, secured to the main frame and to the drag bars respectively. The same effect may be secured by using the coiled spring construction and other mechanism shown in Figs. 9 and 10 hereinafter described.

In order to secure a dust proof bearing for the disks carried on the hubs 18 of the hangers 19 I employ the construction shown in Figs. 5 and 8, the disks 17 being rotatably mounted on thimbles 28 surrounding inner hubs 29 of the main hanger hubs 19. The thimbles are flanged at the outside and extend inwardly into cavities 30 being held in place by washer 31 and bolt 32. The cavity space surrounding the thimble within the main hub is filled with any suitable packing material 33 as hemp or asbestos, and when so constructed and filled with oil, the entire bearing will be practically dust proof and will retain the lubricant.

The apparatus is designed to feed the grain and fertilizer to the disks through a common conduit 34 formed in the interior of the disk hanger 19, arranged to receive the grain or fertilizer or both at its upper portion from their respective boxes and to distribute it to the inner concave side of the disk. For the purpose of accomplishing the feed of the grain and fertilizer, especially the grain, to the disk in an efficient manner and to insure its being properly deposited against the inner concave face 35 of the disk, the conduit 34 is purposely bent as indicated at 36 and also off-set as at 37 and its back wall is sloped forwardly as at 37' whereby the grain is deflected towards the disk and also forwardly and will be discharged towards its lower inner portion. To further insure proper distribution of the grain the hanger is provided with a forwardly extending spoon shaped tongue 38, and as the grain falls against the different bends and finally strikes the concaved tongue 38, the tongue delivers it inwardly against the shoe part of the disk and causes it to fall into the bottom of the groove or furrow made by the disk. It will be observed that the inner face of the disk periphery is flattened as at 39 terminating in a sharp outer edge, so that the concave side of the disk corresponds to the mold board of an ordinary plow, while the convex side of the disk corresponds to the land side. Therefore as the solid ground is on the convex side, as the shoe delivers the grain against the concave or shoe side, it will fall to the bottom of the furrow and the ground will fall in from the other side and cover the grain perfectly.

The grain boxes 40 and fertilizer boxes 41 extend across the machine from side to side and constitute series of compartments of any convenient or desired number, from say five to fifteen according to the size and capacity of the machine, and each of said boxes, i. e. grain and fertilizer respectively, is provided with suitable feeding mechanism.

In Figs. 9 and 10 I have shown a modified construction for the purpose of cushioning the drag bars carrying the hangers and disks against upward pressure thereof, and adapted to admit of simultaneously lifting all of the disks from the ground as in going over a low stump or turning at the end of rows, whereby the operator may easily and quickly lift the disks for clearance. This operation is accomplished by means of a square or polygonal shaft 80 extending across the front portion of the frame, carried in bearings or bushings 81 mounted in brackets 82 extending backwardly from the front cross bar 2'.

The bushings 81 are square or polygonally shaped in their interior to conform to bar 80 and are cylindrical on their exterior so as to be capable of rotation within the bearings 82 as clearly shown. The front ends of the drag bars 20' are provided with supplemental bearing extensions 83 which are preferably bifurcated or in fork shape as shown, the extremities 84 of which are similarly mounted upon bushings 85, conforming in their interior to the cross section of shaft 80 and being cylindrical on the outside to provide an easy bearing for the drag bar extensions and to permit of vertical motion thereof.

86 is a lifting arm, one for each drag bar, keyed upon shaft 80 or in square engagement therewith, so that when said shaft is partially rotated arm 86 will be thrown upwardly underneath the drag bar in the direction of the arrow, it being understood that there is one arm for each drag bar, whereby all of the drag bars will be simultaneously raised corresponding to the extent to which arms 86 may be thrown. Bar 80 and arms 86 are actuated by an operating lever 87 secured upon the shaft at any convenient point and provided with an operating rod 88 extending backwardly to any convenient point at the rear of the machine in convenient position for operation, and provided with any suitable securing or holding mechanism.

The drag bars 20' are cushioned by means of spiral or coiled springs 25' mounted around rods 89, the lower ends of said rods being secured in gudgeons 90 having stems 91 rotatably mounted in bearings 92 secured to bars 20' whereby the gudgeon bearings 90 may move to accommodate themselves to the varying positions of rods 89. The upper ends of said rods extend through sliding bearings 93 also rotatably mounted by pins 94 in the lower arms of locking abutments 95. These locking abutments are pivotally mounted upon a bearing shaft 96 held in bearings 97 secured upon cross bar 2" of the machine as shown. The upper ends 95ª of locking abutments 95, abut against the front face of bar 2" so that in normal position of the device the spring bearings 93 will be maintained rigidly against upper pressure of the drag bars.

For the purpose of disengaging the locking abutments, and throwing the bearing extension 95ª upwardly from contact and to permit of the easy raising of the drag bars, each arm 86 is connected with each of said abutments 95 by means of a link 98, pivoted at one end, as at 99 to arm 86, and at the other end upon stem 94. By this construction, when rod 88 is drawn backwardly the abutments 95 will be simultaneously actuated to swing the bearings 93 downwardly and backwardly and abutment bearings 95ª upwardly at the same time that the rear terminals of arms 86 engage and raise the drag bars, whereby the drag bars may be raised upwardly against the cushioning resistance of springs 25', pins 89 passing freely up through said bearings 93. When the drag bars are again lowered into their normal position as shown in Fig. 9, the full resistance of the cushions 25' will be effective without any tendency to disengage the locking abutments.

The operation of the invention will be readily understood from the foregoing description and it provides a mechanism well adapted for the objects in view, capable of positive feeding of the grain directly into the furrow as made.

It will be understood that my improved disk hanger and its conduit may be changed or varied in construction to suit different mechanisms with which it may be combined, or in proportions, design, etc., to suit different applications of use, but all such changes or variations are to be considered as within the province of the skilled mechanic and to be included within the scope of the following claims.

What I claim is:

1. A disk hanger having a concaved disk and provided on the concave side of the disk with a vertically arranged conduit directed inwardly and downwardly at its middle portion and having front and back walls each extending forwardly in the direction of travel of the disk at its lower delivery portion, and having an extended tongue curved inwardly towards the disk.

2. A disk hanger having a concaved disk and provided on the concave side of the disk with a vertically arranged conduit directed inwardly and downwardly at its middle portion and having front and back walls each extending forwardly in the direction of travel of the disk at its lower delivery portion, and provided beyond its delivery end with a forwardly extending concaved tongue.

3. A disk hanger having a concaved disk and provided on the concave side of the disk with a vertically arranged conduit directed inwardly and downwardly at its middle portion and having front and back walls each extending forwardly in the direction of travel of the disk at its lower delivery portion, and provided beyond its delivery end with a forwardly and downwardly extending concaved tongue.

4. A disk hanger consisting of a single casting provided with a disk bearing, a concaved disk rotatably mounted thereon, said hanger having integral walls forming a vertically arranged conduit, the outer wall thereof being directed inwardly and downwardly at its middle portion, the back and front walls of the lower portion of the conduit being directed forwardly in the direction of travel of the disk.

5. A disk hanger provided with a disk bearing, a concaved disk rotatably mounted thereon, said hanger having integral walls forming a vertically arranged conduit, the outer wall thereof being directed inwardly and downwardly at its middle portion, the back and front walls of the lower portion of the conduit being directed forwardly in the direction of travel of the disk, said conduit having an integral inwardly concaved tongue extending forwardly of and below the discharge end.

6. In a grain drill, the combination with a main frame provided with a storage box, of a disk hanger having a concaved disk and provided on the concave side of the disk with a vertically arranged conduit communicating with the supply box and directed inwardly and downwardly at its middle portion and having its front and back walls extending forwardly in the direction of travel of the disk at its lower portion, said conduit having an integral inwardly concaved tongue extending forwardly of and below the discharge end.

7. In a grain drill, the combination with a main frame provided with a storage box, of a disk hanger having an integral hub carrying a rotatably mounted concaved disk and provided on the concave side of the disk with an integral vertically arranged conduit communicating with the supply box and directed inwardly and downwardly at its middle portion and having its front and back walls extending forwardly in the direction of travel of the disk at its lower portion, and means for feeding the contents of the storage box to the conduit.

8. A disk hanger having an integral bearing hub and a concaved disk rotatably mounted thereon and provided on the concave side of the disk with a vertically arranged conduit directed inwardly and downwardly at its middle portion and having its front and back walls extending forwardly in the direction of travel of the disk at its lower portion, said hanger being provided with a drag bar extending forwardly of the hanger beyond the disk bearing, means for cushioning the drag bar, and means for raising it and the hanger against the cushioning pressure.

9. A disk hanger having a bearing and a concaved disk rotatably mounted thereon and provided on the concave side of the disk with a vertically arranged conduit directed inwardly and downwardly at its middle portion and forwardly in the direction of travel of the disk at its lower portion, said hanger being provided with a drag bar, a cushioning device means for locking the cushioning device in normal position, and means for raising the bar and for unlocking the cushioning device.

In testimony whereof I affix my signature in presence of two witnesses.

DUNY A. SCHUTT.

Witnesses:
KENDRICK E. KENNY,
G. R. CHAMBERLAIN.